United States Patent
Sams

(10) Patent No.: US 9,023,213 B2
(45) Date of Patent: May 5, 2015

(54) TREATMENT OF INTERFACE RAG PRODUCED DURING HEAVY CRUDE OIL PROCESSING

(75) Inventor: Gary W. Sams, Tulsa, OK (US)

(73) Assignee: Cameron Solutions, Inc., Houston, TX (US)

( * ) Notice: Subject to any disclaimer, the term of this patent is extended or adjusted under 35 U.S.C. 154(b) by 1137 days.

(21) Appl. No.: 12/434,160

(22) Filed: May 1, 2009

(65) Prior Publication Data

US 2010/0276375 A1    Nov. 4, 2010

(51) Int. Cl.
*B01D 17/04* (2006.01)
*C10G 33/04* (2006.01)

(52) U.S. Cl.
CPC .............. *B01D 17/042* (2013.01); *C10G 33/04* (2013.01)

(58) Field of Classification Search
CPC ..................................................... B01D 17/042
USPC ........... 210/708, 709, 712, 737; 208/186–188
See application file for complete search history.

(56) References Cited

U.S. PATENT DOCUMENTS

| | | | | |
|---|---|---|---|---|
| 4,407,706 A | * | 10/1983 | Merchant et al. | 204/561 |
| 4,938,876 A | * | 7/1990 | Ohsol | 210/708 |
| 4,971,703 A | * | 11/1990 | Sealock et al. | 210/708 |
| 4,988,427 A | | 1/1991 | Wright | |
| 5,100,559 A | * | 3/1992 | Sealock et al. | 210/708 |
| 5,202,031 A | * | 4/1993 | Rymal, Jr. | 210/703 |
| 5,219,471 A | * | 6/1993 | Goyal et al. | 210/787 |
| 5,368,747 A | * | 11/1994 | Rymal et al. | 210/744 |
| 5,507,958 A | * | 4/1996 | White-Stevens | 210/774 |
| 5,882,506 A | | 3/1999 | Ohsol et al. | |
| 6,120,678 A | * | 9/2000 | Stephenson et al. | 208/188 |
| 6,189,613 B1 | | 2/2001 | Chachula et al. | |
| 7,014,773 B2 | * | 3/2006 | Varadaraj | 210/708 |
| 7,108,780 B2 | * | 9/2006 | Varadaraj | 208/251 R |
| 7,449,429 B2 | * | 11/2008 | Goldman | 507/111 |
| 2004/0167233 A1 | | 8/2004 | Varadaraj | |
| 2005/0193923 A1 | | 9/2005 | Goldman | |
| 2006/0070912 A1 | * | 4/2006 | Khan | 208/13 |

OTHER PUBLICATIONS

International Search Report and Written Opinion issued by the International Searching Authority (ISA/US) in PCT/US2010/031215 on Jun. 4, 2010 (11 pages).

* cited by examiner

*Primary Examiner* — Tony G Soohoo
*Assistant Examiner* — Peter Keyworth
(74) *Attorney, Agent, or Firm* — Gable Gotwals

(57) ABSTRACT

A method for treating an interface rag includes the steps of removing a volume of rag at a controlled rate from an upstream rag source and passing the rag through a high pressure pump and a heater. The heater heats the rag to a temperature of at least 350° F. to thermally decomposing any chemicals that had been added to the interface rag to promote separation. Diluent is then mixed with the heated rag to cool the rag to a temperature less than 300° F. and produce a 30 API rag. The cooled diluted rag is then treated in an electrostatic treater or sent directly to a hydrocyclone cluster. The electrostatic treater is preferably a vertical electrostatic treater with a conical-shaped lower portion and a means for agitating the solid-laden water within the treater to prevent the solids from settling on the bottom of the treater.

20 Claims, 2 Drawing Sheets

TREATMENT OF INTERFACE RAG PRODUCED DURING HEAVY CRUDE OIL PROCESSING

BACKGROUND OF THE INVENTION

This invention relates to systems and methods used in crude oil production. More specifically, the invention relates to methods for treating the rag mixture that accumulates at the oil/water interface inside of separation, dehydration and desalting equipment.

In the production of heavy crude oils such as bitumen, which typically have an API gravity less than 10, light diluents are used to adjust the API gravity to above 15 API. The combination of diluent and bitumen is commonly referred to as "dilbit." Bitumen is produced from subterranean formations by a wide variety of production methods such as steam injection, propane injection, and hot water injection. After the bitumen is produced, it is blended with the diluent to increase the API gravity to about 15 to 17 API. Once the API is above 12 API, conventional oilfield equipment can be utilized. This equipment routinely consists of a free water knockout or FWKO, a 2-phase or 3-phase gravity separator, a mechanical or electrostatic oil dehydrator (treater) and, in some cases, an electrostatic desalter. Once the dilbit has been dehydrated and desalted to an acceptable level, the dilbit can be sold to a refinery.

The quality of 15 API dilbit is very poor. These blends typically contain high levels of solids from the subterranean formation and large quantities of asphaltenes formed by the additional diluents. The solids and asphaltenes permit the formation of a mixture of dilbit, water, solids and asphaltenes, which routinely accumulate at the oil/water interface inside of separation, dehydration and desalting equipment. This mixture is commonly referred to as "rag." If the volume of rag cannot be controlled by the addition of heat, chemicals or electrostatics, then it must be drained from the equipment and processed by an external process.

The volume of rag produced can range from a small volume to several percent of the production stream. Typically, the rag produced is about 1 to 3% of the volume of the produced oil. For example, a Canadian producer might handle 50,000 bpd of bitumen and produce about 500 bpd (barrels per day) of rag.

Additional or external processing of the rag may involve collecting the rag in a large tank to permit separation by gravity. Tank processing, however, requires large volumes of rag and can take days to effectively dehydrate the rag. Handling waste oil volumes in large tanks, therefore, can be expensive and time consuming. Alternatively, the rag may be processed in a flash treater that heats the rag to a temperature above 250° F. and then flashes it to remove the water. Flash treaters, such as those used on Canadian dilbit, leave all the solids, asphaltenes and production salts in the dilbit. These undesirable constituents must then be processed by the refinery. Many refiners have begun to penalize producers for selling flash treated oil.

A need exists for an improved method of treating interface rag.

BRIEF SUMMARY OF THE INVENTION

A method for treating an interface rag includes the step of removing a volume of rag at a controlled rate from at least one upstream separator vessel equipped with a rag drain. The rag is then passed through a pump that provides sufficient pressure to pass the rag to a heater but prevent boiling the water content of the rag and vaporizing the light hydrocarbon content of the rag. The rag is then heated to a first temperature effective for thermally decomposing any chemical previously added to the interface rag to promote separation of the rag. A first temperature of at least 350° F. has proved effective. Additional diluent is mixed with the heated rag to produce a rag having an API gravity of 30. The diluent also cools the 30 API rag to a second temperature of about 300° F. The cooled diluted rag is then passed to a separator device.

The separator device may be an electrostatic treater or a hydrocyclone cluster. The electrostatic treater is preferably a vertical electrostatic treater having a conical-shaped lower portion. To maintain agitation of the solids in the solid-laden water within the electrostatic treater, the water below the oil/water interface may be recycled within the treater. The water level may also be monitored. The solid-laden water is then extracted from the treater and passed to one or more hydrocyclones. The underflow and overflow of the hydrocyclone (or the hydrocyclone cluster) is collected.

A better understanding of the method for treating interface rag will be obtained from the following detailed description of the preferred embodiments taken in conjunction with the drawings and the attached claims.

DETAILED DESCRIPTION OF THE PREFERRED EMBODIMENTS

Figure 1:
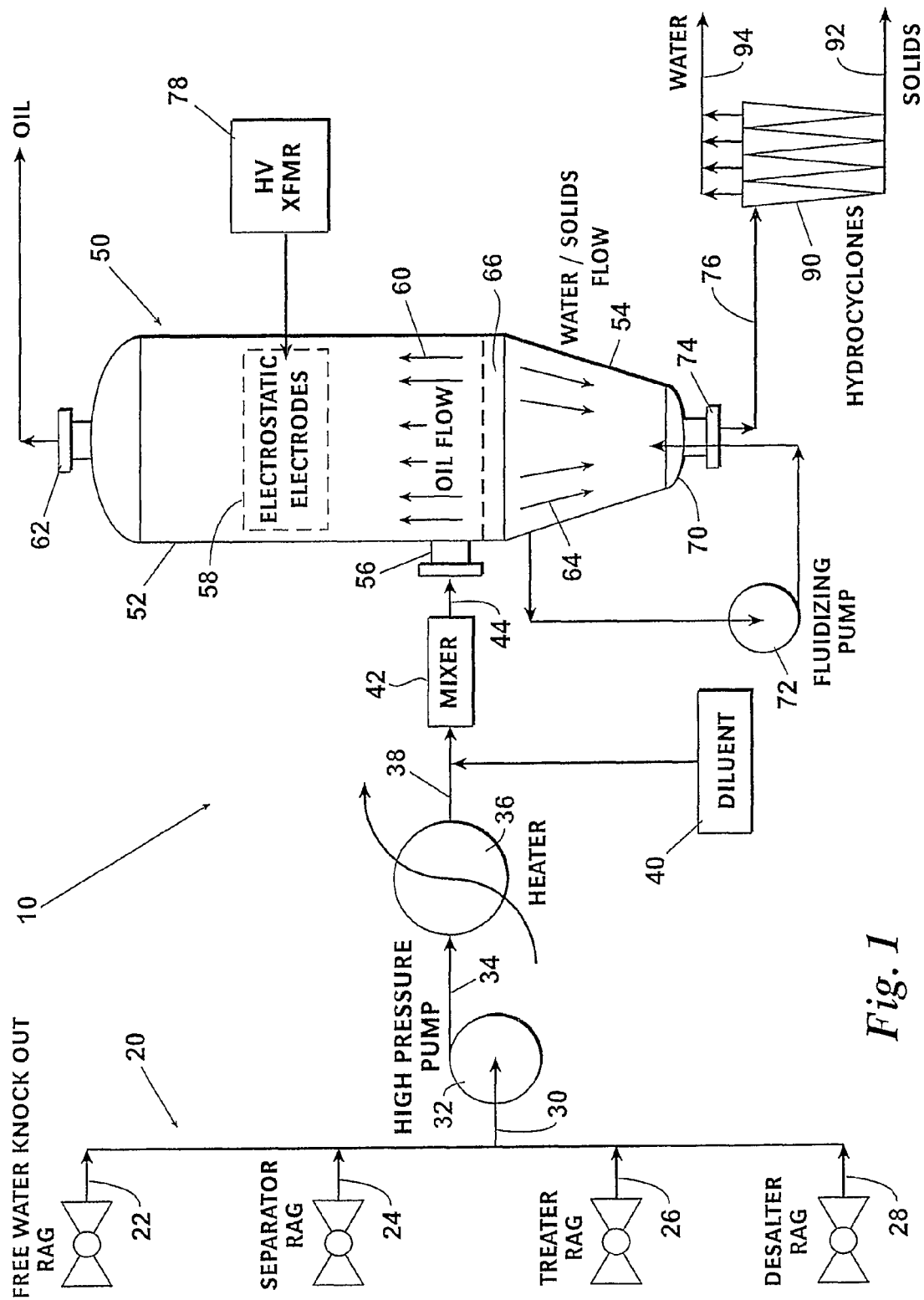
FIG. 1 illustrates a process flow for treating a dilbit interface rag that employs an electrostatic treater and a hydrocyclone cluster to produce a saleable oil.

The preferred embodiments of a method for treating interface rag will be described with reference to the drawings and the drawing elements, which are numbered as follows:

| | |
|---|---|
| 10 | Method/treatment process |
| 20 | Upstream rag sources/flows |
| 22 | Free water knockout rag stream |
| 24 | Separator rag stream |
| 26 | Treater rag stream |
| 28 | Desalter/dehydrator rag stream |
| 30 | Extracted rag stream |
| 32 | High pressure pump |
| 34 | Pressurized rag stream |
| 36 | Heater |
| 38 | Heated rag stream |
| 40 | Additional diluent |
| 42 | Mixer |
| 44 | Diluted rag stream |
| 50 | Electrostatic treater vessel |
| 52 | Upper portion of vessel 50 |
| 54 | Lower portion of vessel 50 |
| 56 | Rag inlet |
| 58 | Electrodes |
| 60 | Oil flow within vessel 50 |
| 62 | Top outlet |
| 64 | Water/solids flow within vessel 50 |
| 66 | Oil/water interface within vessel 50 |
| 68 | Recycled water flow |
| 70 | Bottom end |
| 72 | Fluidizing pump |
| 74 | Bottom outlet |
| 76 | Extracted solid-laden water flow |
| 78 | High voltage transformer |

| | |
|---|---|
| 90 | Hydrocyclone or hydrocyclone cluster |
| 92 | Underflow (solids or water/solids) |
| 94 | Overflow (water or oil) |

While this disclosure has been written primarily for processing rag associated with the production of bitumen, method 10 may be applied to any process involving a heavy crude oil and a diluent, such as in refinery processes.

Referring to FIG. 1, a method 10 for continuous processing and treatment of dilbit interface rag is illustrated that eliminates the need for tank storage and a flash treater and produces a saleable product to a refiner. Method 10 requires rag sources 20—such as a free water knockout, a 2-phase or 3-phase gravity separator, a mechanical or electrostatic oil dehydrator or, in some cases, an electrostatic desalter (indicated by rag streams 22, 24, 26, & 28, respectively)—to be equipped with rag drains or other means that permit the continuous and controlled removal of interface rag from the rag sources 20. One or more of the rag streams 22, 24, 26 & 28 make up the extracted rag stream 30 for further processing by method 10.

Extracted rag stream 30 is transferred by a high pressure pump 32 into a heater 36. Pump 30 increases the pressure of the extracted rag stream 30 to a pressure sufficient to prevent the water content from boiling and the lighter hydrocarbons from vaporizing. The pressurized rag stream 34 is then heated in heater 36 to a temperature that provides for resolution of the rag stream 34. For the most effective rag resolution, the temperature must be increased to over 350° F. At temperatures over 350° F., any chemicals that have been added to the bitumen and dilbit to promote separation are thermally decomposed and can no longer stabilize the heated rag stream 38.

Additional diluent 40 is added to the heated rag stream 38 and mixed in a mixer 38. Diluent 40 serves to cool the heated rag 38 to a temperature about 300° F. and increase the API to an API gravity of about 30. The cooled diluted rag stream 44 is then routed to an inlet 56 of an electrostatic treater 50. Alternatively, it may be routed directly to a hydrocyclone cluster 90 (see FIG. 2).

Electrostatic treater 50 includes electrodes 58—located in an upper portion 52 of treater 50 and in communication with a power source 78—that form an electric field within an interior of treater 50. At 30 API and 300° F., the diluted rag 44 will not be able to suspend the water and solids. The water/solids 64, therefore, readily separate out of the rag 44 and flow to the bottom end 70 of treater 50. Similarly, the oil 60 separates and flows upward to a top outlet 62. Because the rag 44 is likely to contain a high concentration of solids, it is not practical to permit the solids to settle to the bottom end 70 of treater 50 for periodic removal. Rather the water below the oil-water interface 66 should be continuously agitated to keep the solids in suspension.

To maintain agitation and scrub any excess bitumen from the solids, electrostatic treater 50 is preferably a vertical vessel having a conical-shaped lower portion 54. Water can be extracted from below the oil-water interface 66 and recycled by way of a fluidizing pump 72 into the bottom end 70 of treater 50. This recycled, vertical flow of water 68 keeps the solids suspended so the solids may be readily removed. The solid-laden water 64 may be monitored by a level-controller (not shown) and removed by a level-control valve (not shown) through bottom outlet 74.

Unless the extracted water 76 can be disposed of properly, the solids must be removed. This may be accomplished using one or more solid-liquid hydrocyclones 90. The underflow (solids) 92 from hydrocyclone 90 will contain the solids, which may be collected in a small tank (not shown) for disposal. The overflow (water) 94 should be clean enough to be processed by a water treatment facility or injected into a disposal well (not shown). Alternatively, the water from treater 50 may be co-mingled with the water from the other separation processes for further treatment.

Figure 2:
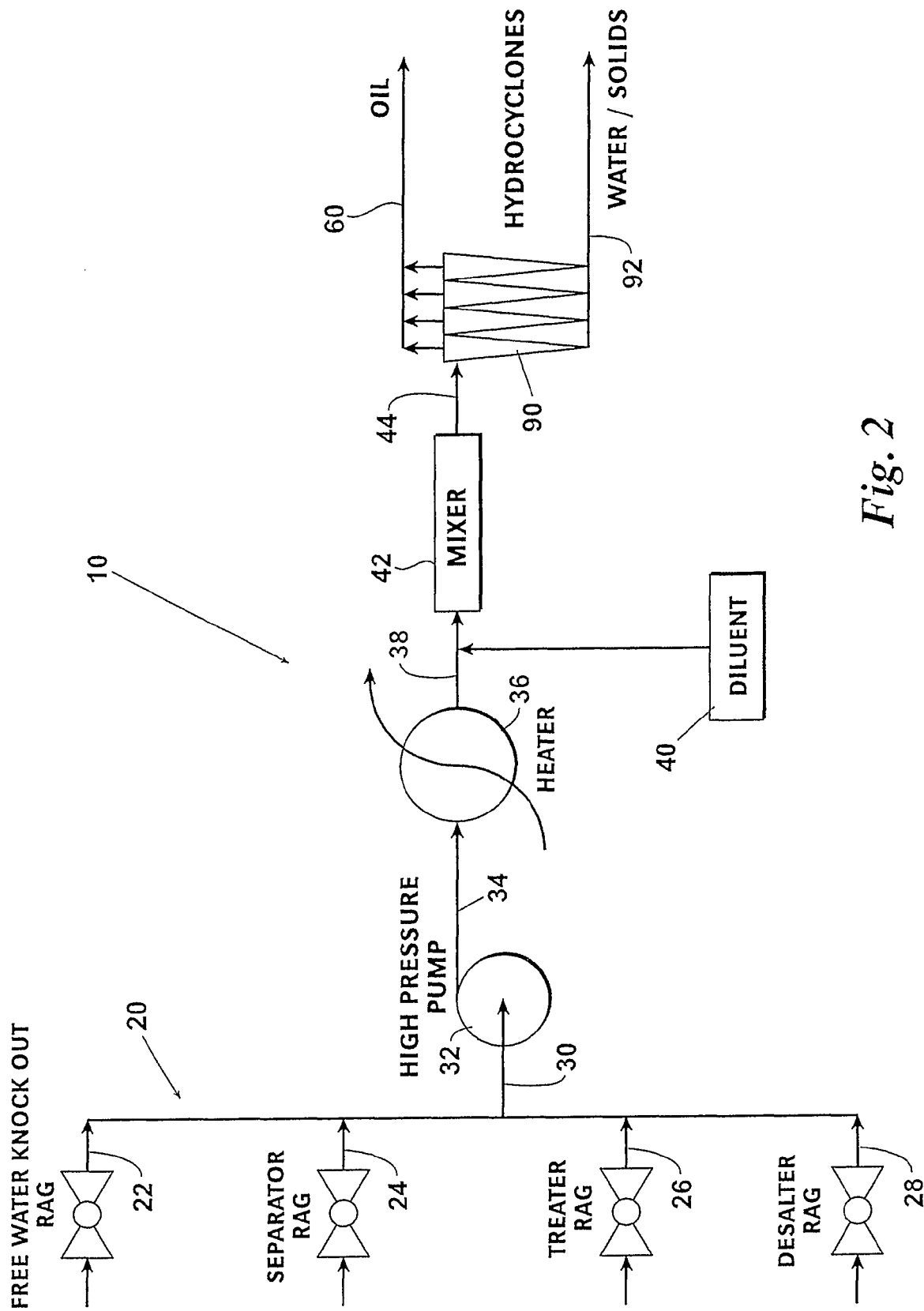
FIG. 2 illustrates a process flow for treating a dilbit interface rag that eliminates the electrostatic treater and instead employs the hydrocyclone cluster alone.

Referring now to FIG. 2, an alternative method 10 eliminates electrostatic treater 50 and processes diluted rag stream 44 in a hydrocyclone cluster 90. Depending on the size of the water droplets and solid particles in rag stream 44, this alternative may not produce a saleable oil 60 but does avoid the cost of electrostatic treater 50.

FIGS. 1 and 2 illustrate equipment that could be assembled as a portable unit that could be moved to various locations where rag exists or where rag has been stored. In other words, portable units capable of performing the methods and processes described and illustrated herein can be transported from site to site to provide rag treatment services.

While method 10 has been described with a certain degree of particularity, many chances may be made in its details without departing from the spirit and scope of this disclosure. The invention, therefore, is limited only by the scope of the attached claims, including the full range of equivalency to which each element thereof is entitled.

What is claimed is:

1. A method for treating an oil/water interface ("rag") extracted from separation, dehydration and desalting equipment, the method comprising the steps of:
   (i) removing a volume of rag from a rag source;
   (ii) passing the volume of rag through a pump to provide pressurized rag, the pressure provided by the pump being effective for preventing boiling a water content of the rag and preventing vaporizing a light hydrocarbon content of the rag;
   (iii) decomposing one or more separation-producing chemicals contained in the volume of rag by heating the pressurized rag to a first temperature of at least 350° F.;
   (iv) mixing an amount of diluent with the heated pressurized rag, the amount of diluent being effective for producing a rag of about 30 API;
   (v) cooling the 30 API rag to a second temperature of less than about 300° F.; and
   (vi) treating the cooled 30 API rag in a separator device to remove at least a substantial portion of water and solids therefrom without a flashing step.

2. A method according to claim 1 further comprising the step of extracting an oil from an upper portion of said separator device.

3. A method according to claim 1 wherein said separator device is an electrostatic treater.

4. A method according to claim 3 wherein said electrostatic treater is a vertical electrostatic treater having a conical-shaped lower portion.

5. A method according to claim 3 further comprising the step of recycling water within said electrostatic treater.

6. A method according to claim 5 further comprising the step of monitoring a level of said water within said electrostatic treater.

7. A method according to claim 3 further comprising the steps of:
   extracting solids-laden water from a lower portion of said electrostatic treater; and
   treating said solids-laden water in one or more hydrocyclones.

8. A method according to claim 7 further comprising the step of collecting overflow oil from said one or more hydrocyclones.

9. A method according to claim 7 further comprising the steps of collecting an underflow of water and solids from said one or more hydrocyclones.

10. A method according to claim 1 wherein said rag source has at least one rag source selected from the group consisting of a free water knockout rag, a separator rag, a treater rag, a desalter rag and a portable tank containing rag.

11. A method according to claim 1 wherein said volume of rag has an API gravity in a range of about 12 to about 17 API.

12. A method according to claim 1 wherein the method does not require tank storage.

13. A method of treating collected interface rag that results from the separation of low gravity hydrocarbons, including solid constituents, from water, comprising the steps of:
   (1) decomposing one or more separation-producing chemicals contained in the collected rag by pumping collected rag through a heater to achieve pressurized, heated rag having a temperature of at least 350° F.;
   (2) mixing the pressurized, heated rag with a hydrocarbon diluent to provide a cooled diluted rag; and
   (3) subjecting the cooled diluted rag to dehydration to separate hydrocarbon product from water and solids without a flashing step.

14. A method of treating interface rag according to claim 13 wherein in step (2) sufficient hydrocarbon diluent is mixed with said pressurized, heated rag to increase the API gravity thereof to at least about 30 API.

15. A method of treating interface rag according to claim 13 wherein in step (2) the diluted rag is cooled to a temperature of less than 300° F. followed by dehydration in an electrostatic treater.

16. A method of treating interface rag according to claim 15 wherein water collected in said electrostatic treater is agitated to keep solids in suspension until the water is discharged from the treater.

17. A method of treating interface rag according to claim 16 wherein a vertical electrostatic treater is employed in step (3) with a conical bottom wherein water is recycled back into a bottom portion of said conical bottom to keep solids in suspension until solids-laden water is removed from said treater.

18. A method of treating interface rag according to claim 13 wherein in step (3) the cooled diluted rag is dehydrated by use of one or more hydrocyclones.

19. A method according to claim 13 wherein apparatus for pumping collected rag through a heater, for mixing pressurized, heated rag with a hydrocarbon diluent and for subjecting cooled diluted rag to dehydration to separate hydrocarbon product from water and solids are carried out in a portable unit that can be transported from site to site to perform rag treatment services.

20. A method according to claim 13 wherein the method does not require tank storage.

\* \* \* \* \*